United States Patent
Tanaka (10) Patent No.: US 9,641,701 B2
(45) Date of Patent: May 2, 2017

(54) IMAGE OUTPUT SYSTEM AND METHOD, AND NON-TRANSITORY COMPUTER READABLE MEDIUM TO CONTROL EXECUTION OF AN IMAGE OUTPUT PROCESS

(71) Applicant: FUJI XEROX CO., LTD., Minato-ku, Tokyo (JP)

(72) Inventor: Tomonori Tanaka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 23 days.

(21) Appl. No.: 14/218,150

(22) Filed: Mar. 18, 2014

(65) Prior Publication Data

US 2015/0043019 A1    Feb. 12, 2015

(30) Foreign Application Priority Data

Aug. 9, 2013   (JP) ................. 2013-166303

(51) Int. Cl.
 *G06F 3/12* (2006.01)
 *H04N 1/00* (2006.01)
 *H04N 1/23* (2006.01)

(52) U.S. Cl.
 CPC ....... *H04N 1/00127* (2013.01); *H04N 1/0083* (2013.01); *H04N 1/2307* (2013.01)

(58) Field of Classification Search
 CPC combination set(s) only.
 See application file for complete search history.

(56) References Cited

U.S. PATENT DOCUMENTS

| | | | | |
|---|---|---|---|---|
| 2008/0144079 | A1* | 6/2008 | Pandey et al. | 358/1.15 |
| 2008/0162567 | A1* | 7/2008 | Yamauchi | H04N 1/00912 |
| 2009/0257086 | A1* | 10/2009 | Takeuchi | H04N 1/00222 358/1.15 |
| 2010/0110486 | A1* | 5/2010 | Takano | 358/1.15 |
| 2013/0042054 | A1* | 2/2013 | Jung | G06F 12/0246 711/103 |
| 2014/0118777 | A1* | 5/2014 | Yamamoto | G06F 3/121 358/1.15 |

FOREIGN PATENT DOCUMENTS

JP   2009-048263 A   3/2009

* cited by examiner

*Primary Examiner* — Henok A Shiferaw
(74) *Attorney, Agent, or Firm* — Sughrue Mion, PLLC (57) ABSTRACT

An image output system includes an obtaining unit, a duplication unit, a generation unit, and an execution unit. The obtaining unit obtains image data. The duplication unit stores duplicate data of the image data in a memory. The generation unit generates a log image based on the duplicate data, and generates log data including the log image, the log data indicating a log of an image output process corresponding to the image data. The execution unit executes, in a case where the duplicate data has been stored, an image output process based on the image data before completion of generation of the log data.

9 Claims, 4 Drawing Sheets

IMAGE OUTPUT SYSTEM AND METHOD, AND NON-TRANSITORY COMPUTER READABLE MEDIUM TO CONTROL EXECUTION OF AN IMAGE OUTPUT PROCESS

CROSS-REFERENCE TO RELATED APPLICATIONS

This application is based on and claims priority under 35 USC 119 from Japanese Patent Application No. 2013-166303 filed Aug. 9, 2013.

BACKGROUND

Technical Field

The present invention relates to an image output system and method, and to a non-transitory computer readable medium.

SUMMARY

According to an aspect of the invention, there is provided an image output system including an obtaining unit, a duplication unit, a generation unit, and an execution unit. The obtaining unit obtains image data. The duplication unit stores duplicate data of the image data in a memory. The generation unit generates a log image based on the duplicate data, and generates log data including the log image, the log data indicating a log of an image output process corresponding to the image data. The execution unit executes, in a case where the duplicate data has been stored, an image output process based on the image data before completion of generation of the log data.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the present invention (hereinafter referred to as an "exemplary embodiment") will be described in accordance with the drawings.

1. Exemplary Embodiment

Figure 1:
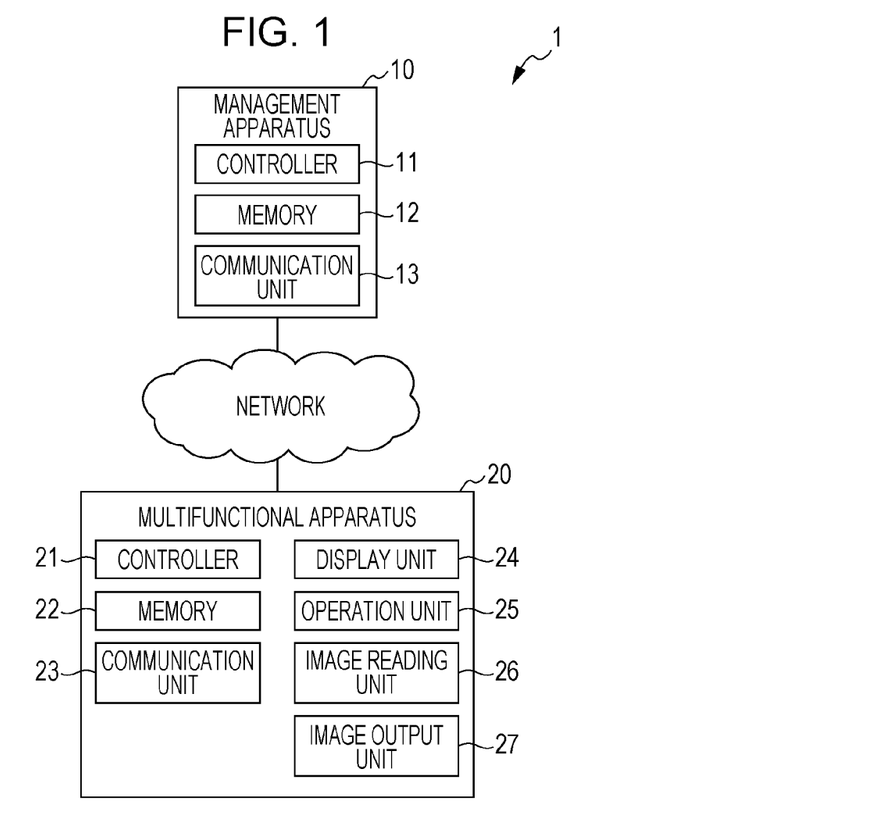
FIG. 1 is a diagram illustrating the configuration of an image output system according to an exemplary embodiment.

FIG. 1 is a diagram illustrating the configuration of an image output system according to the exemplary embodiment. As illustrated in FIG. 1, an image output system 1 includes a management apparatus 10 and a multifunctional apparatus 20. The management apparatus 10 and the multifunctional apparatus 20 (computers) are connected via a network so as to transmit and receive data to and from each other. Although the management apparatus 10 and the multifunctional apparatus 20 are described as single apparatuses here, each of them may be plural apparatuses.

The management apparatus 10 is, for example, a server computer of the related art. The management apparatus 10 includes a controller 11, a memory 12, and a communication unit 13. The controller 11 includes, for example, a central processing unit (CPU), and controls each part of the management apparatus 10 by executing a program stored in the memory 12. The memory 12 includes, for example, a hard disk and various types of memories such as a random-access memory (RAM), stores a program executed by the controller 11 and various types of data, and is used as a work memory. The communication unit 13 includes, for example, a network card or the like, and performs data communication with an external device.

The multifunctional apparatus 20 is an image processing apparatus with multiple functions such as a copier, a printer, and a scanner. For example, the multifunctional apparatus 20 includes a controller 21, a memory 22, a communication unit 23, a display unit 24, an operation unit 25, an image reading unit 26, and an image output unit 27. Since the hardware configurations of the controller 21 to the communication unit 23 are the same as or similar to those of the controller 11 to the communication unit 13, descriptions thereof are omitted.

The display unit 24 is, for example, a liquid crystal panel or the like, and displays various screens in response to instructions from the controller 21. The operation unit 25 is, for example, an input device such as a touch panel. The image reading unit 26 is, for example, a scanner, and obtains read data of an image by optically reading a recording medium (such as a sheet or a film). The image output unit 27 is an image forming unit including, for example, a photoconductive drum and a toner, and forms an image on a recording medium on the basis of image data.

Note that various information storage media are applicable to the memory 12 and the memory 22, and the memory 12 and the memory 22 may be semiconductor memories or the like. Also in the exemplary embodiment, programs and various types of data stored in the memory 12 and the memory 22 may be obtained from external devices via the communication unit 13 and the communication unit 23, respectively. Furthermore, the hardware configurations of the management apparatus 10 and the multifunctional apparatus 20 are not limited to those in the above-described example, and the management apparatus 10 and the multifunctional apparatus 20 may include various types of hardware of the related art.

The multifunctional apparatus 20 executes an image output process in response to an instruction from a user. In the case of execution of an image output process, the multifunctional apparatus 20 generates log data indicating the log of the image output process. Log data is data for identifying which user has output which image and how that image has been output in a past-executed image output process. Log data is under management of the management apparatus 10. By referring to the log data, the system administrator is able to identify, for example, the fact that confidential information or the like has been improperly output or the user who has done this output.

For example, if the multifunctional apparatus 20 waits for an image output process until completion of generation of log data, an image is output after log data is certainly generated. In doing so, security is enhanced, though a job is accumulated since an image output process has been waited for. Therefore, the image output system 1 according to the exemplary embodiment is configured such that, at the time copying of image data is completed, it is regarded that generation of log data is secured, and, an image output process is started without waiting for completion of generation of log data. Hereinafter, this configuration will be described in detail below.

2. Functions Realized in Image Output System

Figure 2:
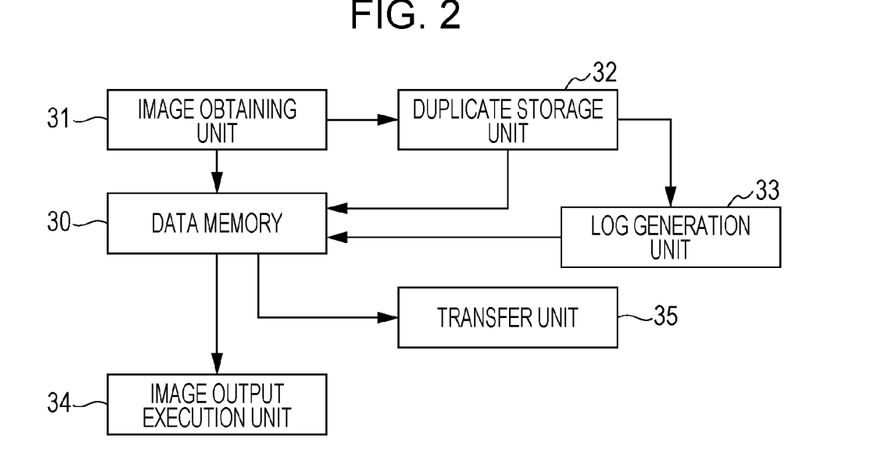
FIG. 2 is a functional block diagram of the image output system.

FIG. 2 is a functional block diagram of the image output system 1. As illustrated in FIG. 2, the image output system 1 realizes a data memory 30, an image obtaining unit 31, a duplicate storage unit 32, a log generation unit 33, an image output execution unit 34, and a transfer unit 35. In the exemplary embodiment, the data memory 30 is realized mainly with the memory 22, and the transfer unit 35 is realized mainly with the controller 21 and the communication unit 23. The other functions are realized mainly with the controller 21.

2-1. Data Memory

The data memory 30 stores image data, duplicate data, and log data. Image data is data indicating an image to be output in an image output process. Duplicate data is data obtained by copying the image data. Log data is a so-called image log and includes various types of information regarding the log of an image output process. Here, the case in which log data includes a log image and a job log will be described. Duplicate data may correspond to a log image, or compressed or reduced duplicate data may correspond to a log image. A job log is data regarding the log of a job, and includes, for example, information regarding the user who has executed the job (such as a user ID) and information regarding the processing content of the job (such as an execution time and date, the number of copies made, and the like). Note that a job log may indicate the log of a job including a group of multiple jobs (a compound job). In addition, content indicated by log data is not limited to that in the foregoing example. It is sufficient to store information indicating the log of an image output process in log data, and log data may be data in an image format.

2-2. Image Obtaining Unit

The image obtaining unit 31 obtains image data. The image obtaining unit 31 obtains image data from another computer (such as a computer operated by the user) via the communication unit 23 or from a storage medium, or obtains image data read by the image reading unit 26. For example, in the case where data configured in a page description language is obtained, the image obtaining unit 31 applies a decomposing process to this data, thereby converting the data into data in a bitmap format or the like and obtaining image data. In the exemplary embodiment, image data indicates multiple images (images of multiple pages). Note that image data may indicate a single image. Image data obtained by the image obtaining unit 31 is temporarily recorded in the data memory 30, and is deleted after an image output process is executed.

2-3. Duplicate Storage Unit

The duplicate storage unit 32 duplicates image data and stores duplicate data in the data memory 30 (such as a non-volatile memory). The duplicate storage unit 32 executes a process of copying image data obtained by the image obtaining unit 31, and records duplicate data generated in this copying process in the data memory 30. Duplicate data recorded in the data memory 30 is deleted after log data is generated.

In the exemplary embodiment, since image data indicates multiple images, the duplicate storage unit 32 generates duplicate data of each image and stores items of duplicate data in the data memory 30. That is, the duplicate storage unit 32 generates duplicate data for each image (for each page), and sequentially records items of duplicate data in the order of generation in the data memory 30. It is sufficient that the order of generating items of duplicate data of the individual images be determined by a predetermined method. For example, items of duplicate data may be generated in the order of pages of the individual images.

2-4. Log Generation Unit

On the basis of duplicate data, the log generation unit 33 generates log data indicating the log of an image output process corresponding to image data (a process of outputting images indicated by image data). The log generation unit 33 stores (records or accumulates) the generated log data in the data memory 30. The log generation unit 33 generates log data from duplicate data on the basis of a predetermined log generation method. Various methods of the related art are applicable to the log generation method itself.

In the exemplary embodiment, the log generation unit 33 generates an image log by compressing duplicate data, and adds auxiliary information (job log) regarding an image process, thereby generating log data. The auxiliary information includes, for example, the user ID of the user who has executed the job, the job execution time and date, the number of outputs, and the like. It is assumed that these pieces of information are input to the multifunctional apparatus 20 in the case where an image output instruction is given. For example, it is assumed that the multifunctional apparatus 20 receives, along with images, information for generating auxiliary information from a computer which has transmitted an image output instruction.

In addition, after duplicate data is stored in the data memory 30, the log generation unit 33 starts a log data generation process. That is, the log generation unit 33 executes generation of log data on the basis of duplicate data of each image stored in the data memory 30.

2-5. Image Output Execution Unit

After duplicate data is stored, the image output execution unit 34 executes an image output process on the basis of image data before completion of generation of log data. In the exemplary embodiment, the start timing of an image output process differs according to certainty (generation assurance level) regarding generation of log data. For example, two types, namely, "a low generation assurance level" and "a high generation assurance level", are prepared, and the system administrator or user is able to select one from these two levels.

In Case of Low Generation Assurance Level

Figure 3:
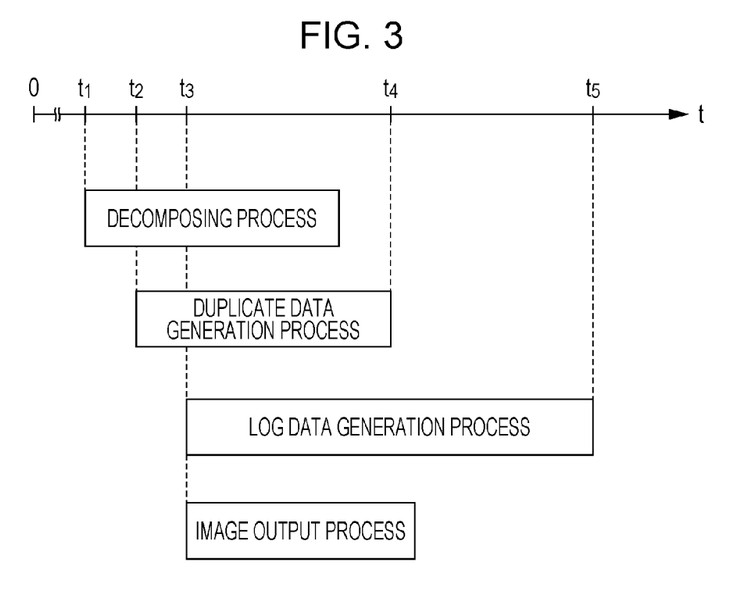
FIG. 3 is a diagram illustrating the execution timing of each process in the case of a low generation assurance level.

FIG. 3 is a diagram illustrating the execution timing of each process in the case of a low generation assurance level, in which the t axis represents a time axis. As illustrated in FIG. 3, first a print instruction (job start instruction) is given, and, in response to this, the image obtaining unit 31 starts a decomposing process (time $t_1$). When image data is obtained by the decomposing process, the duplicate storage unit 32 starts a process of generating duplicate data (time $t_2$). A process of generating duplicate data is started at time $t_2$, which is after time $t_1$ at which a decomposing process is started. When duplicate data is generated, the log generation unit 33 starts a process of generating log data (time $t_3$). For example, the log generation unit 33 generates log data with a background process. A process of generating log data by the log generation unit 33 is started at time $t_3$, which is after time $t_2$ at which a process of generating duplicate data by the duplicate storage unit 32 is started.

In the case of a low generation assurance level, after items of duplicate data of some images among multiple images are stored and before all the items of duplicate data are stored (before time $t_4$), the image output execution unit 34 starts an image output process corresponding to these some images. In other words, the image output execution unit 34 starts an image output process before completion of a process of storing duplicate data by the duplicate storage unit 32 (before time $t_4$). For example, in the case where the first item of duplicate data is stored, the image output execution unit 34 executes an image output process of an image corresponding to this duplicate data. Thereafter, in the case where the n-th (n is a natural number) item of duplicate data (duplicate data of an image of the n-th page) is stored, the image output execution unit 34 similarly executes an image output process of an image corresponding to the n-th item of duplicate data.

In FIG. 3, a process of generating log data is completed at time $t_5$, which is after time $t_4$. That is, since the image output execution unit 34 starts an image output process without waiting for time $t_5$, a delay in the image output process is moderated. Although the start timing of a process of generating log data by the log generation unit 33 and the start timing of an image output process performed by the image output execution unit 34 are equal at time $t_3$ in the example illustrated in FIG. 3, these execution timings may be different.

In Case of High Generation Assurance Level

Figure 4:
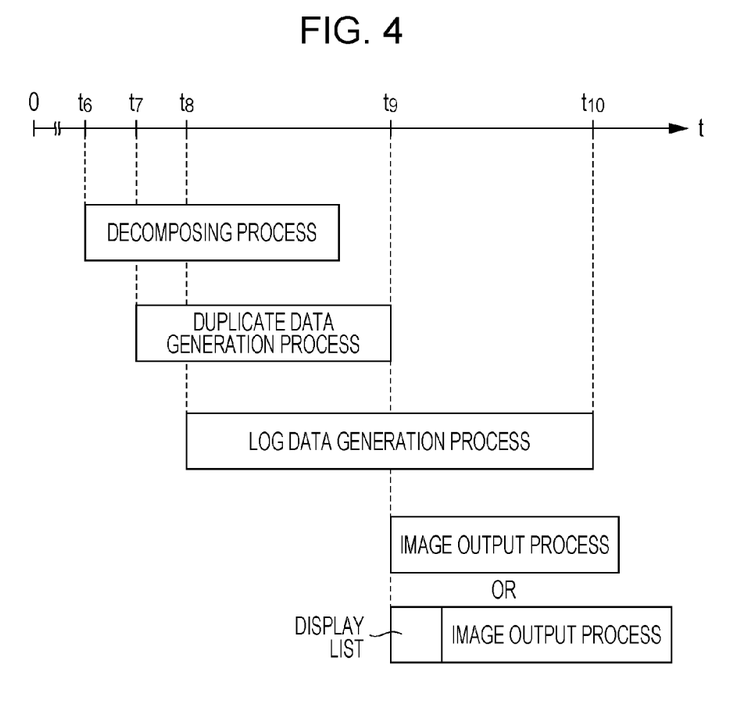
FIG. 4 is a diagram illustrating the execution timing of each process in the case of a high generation assurance level.

FIG. 4 is a diagram illustrating the execution timing of each process in the case of a high generation assurance level. Times $t_6$ to $t_{10}$ illustrated in FIG. 4 are respectively the same as times $t_1$ to $t_5$ illustrated in FIG. 3. As illustrated in FIG. 4, in the case of a high generation assurance level, the image output execution unit 34 starts an image output process after items of duplicate data of all images are stored. That is, after a process of storing duplicate data by the duplicate storage unit 32 is completed (after time $t_9$), the image output execution unit 34 starts an image output process. In the case where the image output execution unit 34 starts an image output process after a list of items of image data is displayed on the display unit 24 (in the case of a so-called private printing), a list is displayed after a process of storing duplicate data by the duplicate storage unit 32 is completed (after time $t_9$), and, in the case where a start operation is performed by the user, an image output process is started.

2-6. Transfer Unit

The transfer unit 35 transfers log data to the management apparatus 10. For example, in the case where a predetermined transfer condition is satisfied, the transfer unit 35 transfers log data accumulated in the data memory 30 to the management apparatus 10. A transfer condition is a condition for transferring log data and is, for example, whether a predetermined time has arrived, whether an operation to start transfer is performed from the operation unit 25 or the like, or whether a transfer request from the management apparatus 10 has been received. The transfer unit 35 may transfer all items of log data accumulated in the data memory 30, or may transfer only some of the items of log data. The log data transferred by the transfer unit 35 is deleted in the case where a predetermined condition is satisfied. For example, the log data may be deleted in the case where the number of items of log data transferred to the management apparatus 10 and the number of items of log data that has not been transferred to the management apparatus 10 each become equal to or greater than a threshold, or the log data may be deleted every time the transfer unit 35 transfers the log data.

3. Process Executed in Image Output System

Figure 5:
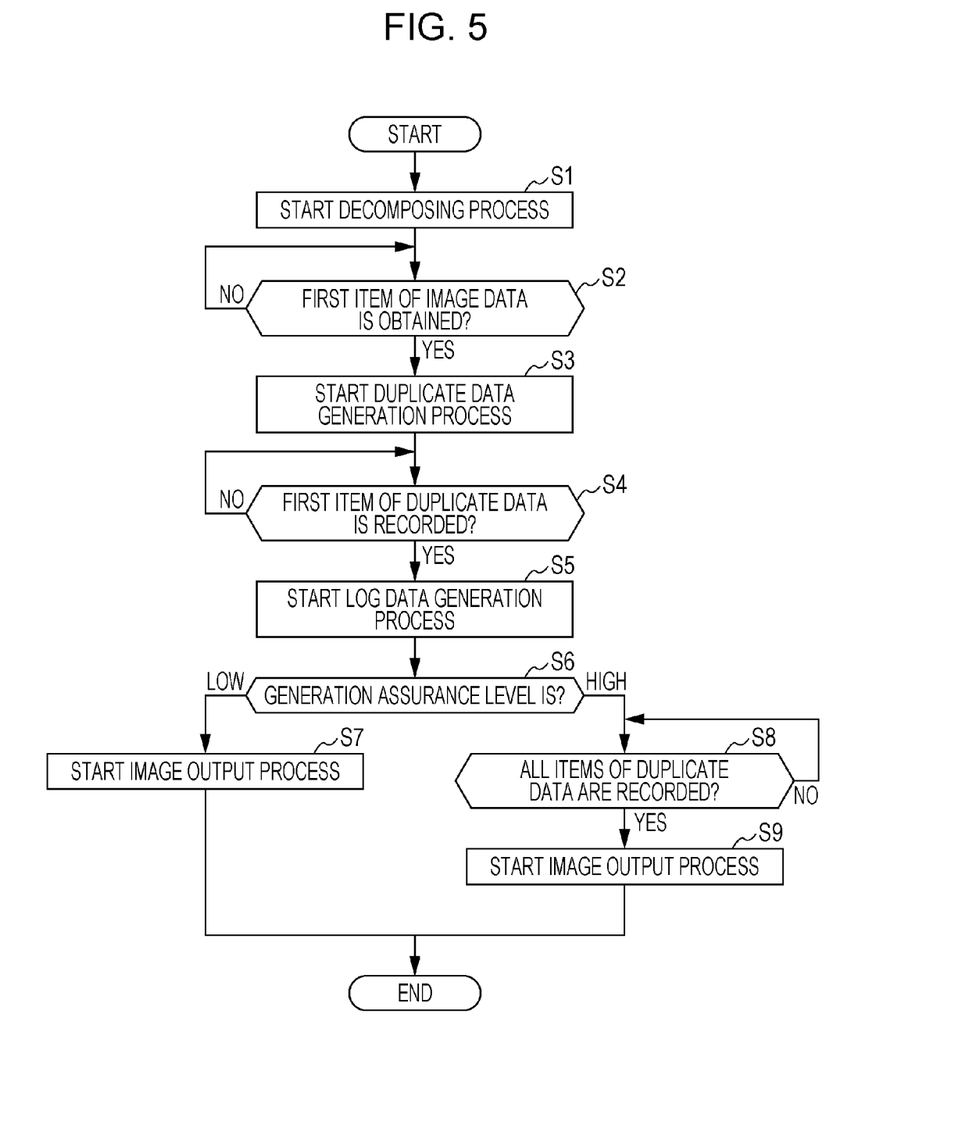
FIG. 5 is a flowchart illustrating a process executed by the image output system.

FIG. 5 is a flowchart illustrating a process executed by the image output system 1. Here, the controller 21 executes the process illustrated in FIG. 5 in accordance with a program stored in the memory 22 in the case where a print instruction is accepted. The functions illustrated in FIG. 2 are realized by executing the process illustrated in FIG. 5.

As illustrated in FIG. 5, first the controller 21 starts a decomposing process (S1). In execution of the process, the multifunctional apparatus 20 accepts a print instruction from an external computer or the like. It is assumed that the print instruction includes data corresponding to an image(s) to be output (for example, data in a page description language) and information regarding the user who has given the instruction and a job (for example, the number of output pages). In step S1, the controller 21 performs a decomposing process and converts the received data in a page description language into image data in a bitmap format or the like. In the case where a print instruction for multiple images is given, the controller 21 converts the data into image data of each image, and records the image data in the memory 22.

The controller 21 determines whether the first item of image data has been obtained (S2). In step S2, the controller 21 refers to the memory 22 and determines whether which item of image data of multiple images for which the print instruction has been given is recorded in the memory 22. If it is not determined that the first item of image data has been obtained (S2; N), the process returns to step S2. In this case, since the decomposing process is underway, obtaining of image data is awaited.

On the contrary, if it is determined that the first item of image data has been obtained (S2; Y), the controller 21 starts a duplicate data generation process (S3). In step S3, the controller 21 performs a process of copying the image data recorded in the memory 22, and records duplicate data in a non-volatile memory of the memory 22.

The controller 21 determines whether the first item of duplicate data has been recorded in the memory 22 (S4). A determination method in step S4 is the same as or similar to that in step S2, and the controller 21 determines whether which item of duplicate data of multiple images for which the print instruction has been given is recorded in the memory 22. If it is not determined that the first item of duplicate data has been recorded (S4; N), the process return to step S4. In this case, since the duplicate data generation process (copy process) is underway, generation of duplicate data is awaited.

On the contrary, if it is determined that the first item of duplicate data has been recorded in the memory 22 (S4; Y), the controller 21 starts a log data generation process (S5). In step S5, the controller 21 starts generation of log data on the basis of the duplicate data recorded in the memory 22 and the information included in the print instruction. For example, the controller 21 generates log data by associating a job log with a log image generated by compressing or reducing the duplicate data recorded in the memory 22.

The controller 21 identifies the currently set generation assurance level (S6). Information for identifying the generation assurance level is stored in the memory 22 or the like, and the controller 21 changes this information in accordance with an operation performed by the user or the system administrator.

In the case of a "low" generation assurance level (S6; "low"), the controller 21 starts an image output process (S7). In step S7, the controller 21 outputs an image(s) from the image output unit 27 on the basis of the image data recorded in the memory 22. If items of image data of all images are not generated in the memory 22, the controller 21 sequentially executes an image output process of an image(s) whose image data has been obtained.

On the contrary, in the case of a "high" generation assurance level (S6; "high"), the controller 21 determines whether items of duplicate data of all images to be output have been recorded in the memory 22 (S8). In step S8, the controller 21 determines whether items of duplicate data corresponding to all images included in the print instruction have been recorded in the memory 22.

If it is not determined that all items of duplicate data have been recorded in the memory 22 (S8; N), the process returns to step S8. In this case, the controller 21 waits for the start of an image output process until items of duplicate data of all images for which the print instruction has been given are recorded in the memory 22.

On the contrary, if it determined that all items of duplicate data have been recorded in the memory 22 (S8; Y), the controller 21 starts an image output process (S9). In step S9, since items of image data of all images for which the print instruction has been given are recorded in the memory 22, the controller 21 outputs all these images from the image output unit 27.

The above-described image output system 1 moderates a delay in an image output process in the case where an image output apparatus certainly generates data indicating the log of the image output process. That is, the multifunctional apparatus 20 starts an image output process since generation of log data is secured at the time duplicate data is recorded in the memory 22. Compared with the case in which an image output process is started after waiting for completion of generation of all items of log data, the start timing of an image output process may be made earlier.

In addition, the image output system 1 moderates a delay in an image output process by preliminarily starting an image output process corresponding to some images whose duplicate data has been generated. For example, in the case of a "low" generation assurance level, if items of duplicate data of some images are recorded in the memory 22, the multifunctional apparatus 20 regards that generation of log data corresponding to these images has been secured, and precedently executes an image output process of images for which duplicate data has been generated, without waiting for completion of generation of items of duplicate data of all images. Therefore, the multifunctional apparatus 20 in the case of a "low" generation assurance level moderates a delay in the image output process in a more effective manner.

In addition, the image output system 1 starts an image output system after items of duplicate data of all images have been stored, and certainly generates data indicating the log of the image output process. For example, in the case of a "high" generation assurance level, the multifunctional apparatus 20 starts an image output process after confirming that items of duplicate data of all images to be output have been recorded in the memory 22. In doing so, log data is more certainly generated, and, compared with the case in which an image output process is started after waiting for completion of generation of log data, a delay in the image output process is moderated.

4. Modifications

The exemplary embodiment is not limited to that described above, and appropriate changes may be made within the scope thereof.

(1) For example, if a free space of a memory area for storing duplicate data and log data becomes smaller, generation and recording of log data may not be performed even though the multifunctional apparatus 20 generates duplicate data. In this case, the multifunctional apparatus 20 may cancel or wait for generation of duplicate data.

In the case where the free space of the data memory 30 becomes less than or equal to a threshold (such as 1 GB) during generation of duplicate data of each image, the log generation unit 33 limits generation of duplicate data thereafter. The threshold may be a fixed value or may be a variable value in accordance with an operation or the like performed by the system administrator or the user. In addition, the free space may be the free space of the memory itself or may be a free space in an area where duplicate data and log data are to be stored. In addition, generation of duplicate data thereafter is a process of generating duplicate data of an image(s) whose duplicate data has not been generated yet. Note that the above limitation may be performed in the case of a low generation assurance level.

Here, limitation of generation of duplicate data corresponds to cancellation of a duplicate data generation process or waiting for (postponing or pending) a duplicate data generation process. For example, if execution of another print job is completed, image data, duplicate data, and the like generated in this print job are deleted from the data memory 30, and this may increase the free space while a duplicate data generation process is being waited for. Therefore, if generation of duplicate data is waited for, the log generation unit 33 may restart generation of duplicate data if the free space becomes greater than or equal to a threshold. If a duplicate data generation process is cancelled, duplicate data may be deleted after the end of a decomposing process.

According to the modification (1), generation of duplicate data is limited in the case where the free space of the data memory 30 is small.

(2) In addition, for example, in the case of a high generation assurance level, if the free space becomes small during generation of duplicate data, log data may certainly be generated by waiting for a job regarding an image output process or the like.

The image output execution unit 34 limits a job regarding an image output process if the free space of the data memory 30 becomes less than or equal to a threshold during generation of duplicate data of each image. A job regarding an image output process is a job generated for executing an image output process and includes, for example, a decomposing process, a duplicate data generation process, a log data generation process, and an image output process. Limitation of a job corresponds to cancellation of these processes or waiting for these processes.

As with the case of the modification (1), if a job is waited for, the free space may increase when another print job is completed. In this case, the waited job may be restarted. In addition, if a job has been cancelled, the multifunctional apparatus 20 may notify the user, who has given an instruction to execute that job, of the cancellation, and may prompt the user to re-execute that job.

According to the modification (2), a job regarding an image output process is limited in the case where the free space of the data memory 30 is small.

(3) In addition, for example, if log data that has not been transferred to the management apparatus 10 increases, generation of various jobs regarding an image output process may be limited.

The image output execution unit 34 limits generation of a job regarding an image output process if the number of items of yet-to-be-transferred log data becomes greater than or equal to a threshold. The number of items of yet-to-be-transferred log data is the number of items of log data accumulated in the data memory 30. In addition, here, limitation of generation of a job may correspond to no generation of new jobs or reduction of the number of newly generated jobs to be smaller than that in a normal circumstance (prior to the limitation). Note that the threshold may be a fixed value or may be a variable value in accordance with a user operation or the like.

According to the modification (3), a job regarding an image output process is limited in the case where the number of items of yet-to-be-transferred log data is great.

(4) In addition, for example, old log data may be deleted, for example, in the case where the number of items of log data that has not been transferred to the management apparatus 10 increases.

In the case where the number of items of yet-to-be-transferred log data becomes greater than or equal to a threshold, the log generation unit 33 deletes at least one of the items of yet-to-be-transferred log data on the basis of the order in which the items of yet-to-be-transferred log data have been accumulated. For example, each item of log data is associated with information regarding the accumulation order in the memory 22.

When recording generated log data in the memory 22, the log generation unit 33 adds information regarding the order to the log data. This information may be a numeral indicating the order or may be information regarding a time and date. The log generation unit 33 deletes one or more oldest items of log data among the items of yet-to-be-transferred log data. For example, the log generation unit 33 deletes an item(s) of log data, the number of which is equal to the difference between the number of items of yet-to-be-transferred log data and a threshold.

According to the modification (4), in the case where the number of items of yet-to-be-transferred log data is great, an item(s) of yet-to-be-transferred log data are deleted in accordance with the order in which the items of yet-to-be-transferred log data have been stored.

(5) In addition, for example, in the case where log data is transferred to the management apparatus 10 every time a job is executed (job unit automatic transfer), security is enhanced if an image output process is started after the multifunctional apparatus 20 transfers the log data to the management apparatus 10. In this case, however, since the start of an image output process is delayed, an image output process may be started at the time some items of log data are transferred.

Figure 6:
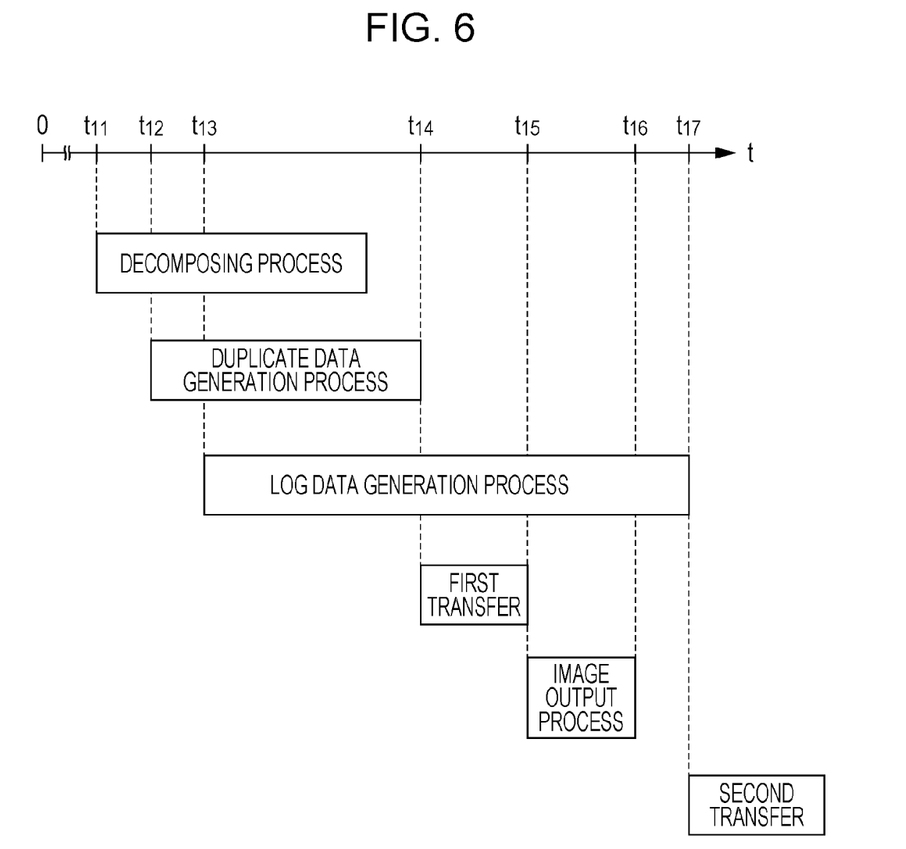
FIG. 6 is a diagram illustrating the execution timing of each process in modification (5).

FIG. 6 is a diagram illustrating the execution timing of each process in the modification (5). Times $t_{11}$ to $t_{14}$ and $t_{17}$ illustrated in FIG. 6 are respectively the same as times $t_1$ to $t_5$ illustrated in FIG. 3. As illustrated in FIG. 6, the transfer unit 35 transfers some items of log data being generated to the management apparatus 10 before completion of generation of log data (before time $t_{17}$). Some items of log data are data other than those items of log data corresponding to duplicate data and may be, for example, part of a job log (for example, only information for identifying the user who has executed the job and for identifying the job). For example, the transfer unit 35 transfers part of a job log to the management apparatus 10 after completion of generation of duplicate data (time $t_{14}$). Note that, at this point, it is assumed that part of the job log has already been generated.

The image output execution unit 34 starts an image output process after some items of log data have been transferred (after time $t_{15}$) and before completion of generation of log data (before time $t_{17}$). That is, the image output execution unit 34 waits for execution of an image output process until time $t_{15}$. In addition, when generation of log data is completed (time $t_{17}$), the transfer unit 35 transfers the generated log data to the management apparatus 10. For example, when generation of log data is completed (time $t_{17}$) and when an image output process is completed (time $t_{16}$), the transfer unit 35 transfers the log data.

According to the modification (5), an image output process is started after some items of log data being generated have been transferred. Therefore, for example, the multifunctional apparatus 20 secures log data by transferring only minimum part of a job log to the management apparatus 10, and starts an image output process, thereby effectively moderating a delay.

Note that, in the modification (5), the timing to transfer part of a job log (intermediate transfer) may be changed in accordance with the type of an image output process. For example, in the case of a job that involves inputting and outputting of an image(s), part of a job log may be transferred at the time duplicate data is generated; in the case of a job that involves only output or a job that involves an output of multiple documents, part of a job log may be transferred after it has been confirmed that duplicate data has been generated.

(6) In addition, for example, the above-described modifications may be combined.

In addition, although the case in which, for example, the generation assurance level is set has been described above, the generation assurance level may not necessarily be set. In this case, it is sufficient that an image output process be started at any of the above-described start timings.

In addition, although the case in which log data includes a log image and a job log has been described above, only a log image may correspond to log data. In this case, a job log may be associated with log data. Furthermore, data stored in log data is not limited to that in the above-described example, and it is sufficient that data for identifying the log of an image output process be included in log data.

In addition, although the case in which log data generated by the multifunctional apparatus 20 is transferred to the management apparatus 10 has been described, log data may be accumulated and saved in the multifunctional apparatus 20. In addition, although a process of forming an image on a recording medium has been described as an image output process, a process of reading an image with the image reading unit 26 and outputting the read data may correspond to an image output process. In this case, information regarding the log of a process of reading an image, which is performed by the user with the multifunctional apparatus 20, corresponds to log data.

In addition, although the case in which the image output system 1 includes the management apparatus 10 and the multifunctional apparatus 20 has been described, the image output system 1 may be realized with one computer. In this case, for example, one multifunctional apparatus corresponds to the image output system.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image output system comprising:
   a processor; and memory storing executable instructions that, when executed by the processor, causes the processor to perform:

inputting an instruction for an image output process;

decomposing data according to the instruction;

duplicating image data obtained by the decomposition and storing the duplicated image data;

in response to the duplicated image data being stored in the memory, starting the image output process of the image data according to the instruction; and generating log image data which includes (1) a log image generated based on the duplicated image data and (2) log data indicating a log of the image output process, wherein the image data comprises image data of a plurality of images, wherein the storing the duplicated image data comprises storing duplicated image data of each of the plurality of images in the memory, wherein, after the duplicated image data of at least one of the plurality of images has been stored, the starting the image output process comprises starting the image output process corresponding to the at least one of the plurality of images before the duplicated image data of all the images is stored, and wherein the memory stores further executable instructions that, when executed by the processor, causes the processor to perform:

storing the generated log image data in the memory, wherein during the duplicating of the image data of each image, in response to a determination that space available in the memory becomes less than or equal to a threshold, limiting the duplicating of the image data.

2. The image output system according to claim 1, wherein, after the duplicated image data of all the images has been stored, the starting the image output process comprises starting the image output process corresponding to each image.

3. The image output system according to claim 1, wherein the memory stores further executable instructions that, when executed by the processor, causes the processor to perform:

transferring, in a case where a predetermined transfer condition is satisfied, the log image data accumulated in the memory to a management apparatus, wherein, in a case where the number of items of yet-to-be-transferred log image data becomes greater than or equal to a threshold, limiting a job related to the image output process.

4. The image output system according to claim 1, wherein the memory stores further executable instructions that, when executed by the processor, causes the processor to perform:

transferring, in a case where a predetermined transfer condition is satisfied, the log image data accumulated in the memory to a management apparatus; and deleting, in a case where the number of items of yet-to-be-transferred log image data becomes greater than or equal to a threshold, at least one of the items of yet-to-be-transferred log image data from the memory in accordance with an order in which the items of yet-to-be-transferred log image data have been stored in the memory.

5. The image output system according to claim 1, wherein the memory stores further executable instructions that, when executed by the processor, causes the processor to perform:

transferring, before completion of generation of all the log image data, at least one generated item of the log image data to a management apparatus, wherein, after the at least one generated item of the log image data has been transferred, the starting the image output process comprises starting the image output process before completion of generation of the log image data, and wherein, after generation of the log image data is completed, the transferring comprises transferring remaining items of the log image data whose generation has been completed to the management apparatus.

6. An image output system comprising:

a processor; and memory storing executable instructions that, when executed by the processor, causes the processor to perform:

inputting an instruction for an image output process;

decomposing data according to the instruction;

duplicating image data obtained by the decomposition and storing the duplicated image data;

in response to the duplication of image data being started, starting the image output process of the image data according to the instruction; and generating log image data which includes (1) a log image generated based on the duplicated image data and (2) log data indicating a log of the image output process, wherein the image data comprises image data of a plurality of images, wherein the storing the duplicated image data comprises storing duplicated image data of each of the plurality of images in the memory, wherein, after the duplicated image data of at least one of the plurality of images has been stored, the starting the image output process comprises starting the image output process corresponding to the at least one of the plurality of images before the duplicated image data of all the images is stored, and wherein the memory stores further executable instructions that, when executed by the processor, causes the processor to perform:

storing the generated log image data in the memory, wherein during the duplicating of the image data of each image, in response to a determination that space available in the memory becomes less than or equal to a threshold, limiting the duplicating of the image data.

7. A non-transitory computer readable medium storing a program causing a computer to execute a process, the process comprising:

inputting an instruction for an image output process;

decomposing data according to the instruction;

duplicating, using an image output system, image data obtained by the decomposition and storing, in a memory of the image output system, the duplicated image data;

in response to the duplicated image data being stored in the memory, starting the image output process of the image data according to the instruction; and generating log image data which includes (1) a log image generated based on the duplicated image data and (2) log data indicating a log of the image output process, wherein the image data comprises image data of a plurality of images, wherein the storing the duplicated image data comprises storing duplicated image data of each of the plurality of images in the memory, wherein, after the duplicated image data of at least one of the plurality of images has been stored, the starting the image output process comprises starting the image output process corresponding to the at least one of the plurality of images before the duplicated image data of all the images is stored, and wherein the process further comprises:

storing the generated log image data in the memory, wherein during the duplicating of the image data of each image, in response to a determination that space available in the memory becomes less than or equal to a threshold, limiting the duplicating of the image data.

8. A non-transitory computer readable medium storing a program causing a computer to execute a process, the process comprising:

inputting an instruction for an image output process;

decomposing data according to the instruction;

duplicating, using an image output system, image data obtained by the decomposition and storing, in a memory of the image output system, the duplicated image data;

in response to the duplication of image data being started, starting the image output process of the image data according to the instruction; and generating log image data which includes (1) a log image generated based on the duplicated image data and (2) log data indicating a log of the image output process, wherein the image data comprises image data of a plurality of images, wherein the storing the duplicated image data comprises storing duplicated image data of each of the plurality of images in the memory, wherein, after the duplicated image data of at least one of the plurality of images has been stored, the starting the image output process comprises starting the image output process corresponding to the at least one of the plurality of images before the duplicated image data of all the images is stored, and wherein the process further comprises:

storing the generated log image data in the memory, wherein during the duplicating of the image data of each image, in response to a determination that space available in the memory becomes less than or equal to a threshold, limiting the duplicating of the image data.

9. An image output method comprising:

inputting an instruction for an image output process;

decomposing data according to the instruction;

duplicating, using an image output system, image data obtained by the decomposition and storing, in a memory of the image output system, the duplicated image data;

in response to the duplicated image data being stored in the memory, starting the image output process of the image data according to the instruction; and generating log image data which includes (1) a log image generated based on the duplicated image data and (2) log data indicating a log of the image output process, wherein the image data comprises image data of a plurality of images, wherein the storing the duplicated image data comprises storing duplicated image data of each of the plurality of images in the memory, wherein, after the duplicated image data of at least one of the plurality of images has been stored, the starting the image output process comprises starting the image output process corresponding to the at least one of the plurality of images before the duplicated image data of all the images is stored, and wherein the process further comprises:

storing the generated log image data in the memory, wherein during the duplicating of the image data of each image, in response to a determination that space available in the memory becomes less than or equal to a threshold, limiting the duplicating of the image data.

* * * * *